United States Patent Office 3,830,812
Patented Aug. 20, 1974

3,830,812
HERBICIDAL AND GROWTH-REGULANT COMPOSITIONS BASED ON NOVEL PYRIMIDO[4,5-d] PYRIMIDINONES
Arthur Albert Ramsey, Middleport, N.Y., assignor to FMC Corporation, New York, N.Y.
No Drawing. Filed July 10, 1972, Ser. No. 270,049
Int. Cl. C07d 51/46
U.S. Cl. 260—256.4 F
7 Claims

ABSTRACT OF THE DISCLOSURE

A class of herbicidal compounds consisting of 2,5-dialkyl- and 2,5,7-trialkylpyrimido[4,5-d]pyrimidin-4(3H)-ones exhibits pre-emergence and post-emergence herbicidal activity. The synthesis of members of this class is described in detail and the utility of representative compounds is exemplified.

---

This invention pertains to the general field of herbicides and particularly to compositions which control plant growth. Isoxazolo- and isothiazolopyrimidinones exhibiting herbicidal activity are described in copending U.S. Patent Applications Ser. No. 31,414, filed Apr. 23, 1970, now U.S. Pat. 3,679,682, and Ser. Nos. 189,779, 189,780, and 189,781, filed Oct. 15, 1971.

Pyridopyrimidinediones having herbicidal activity are described in Canadian Pat. 887,066, issued Nov. 30, 1971. U.S. Pat. 3,642,797, issued Feb. 15, 1972, describes pyridopyrimidinones useful as anti-inflammatory agents. Novel pyrido-s-triazinediones stated to be useful as herbicides are described in Swiss Patenschrift 508,646, granted June 15, 1971.

Neither the alkylpyrimido[4,5-d]pyrimidin-4(3H)-one compounds of the present invention, nor the outstanding plant responses in pre-emergence and post-emergence herbicidal activity of the compounds of the present invention, have been previously reported or suggested in the art.

This invention relates to novel herbicidal compounds, to new herbicidal compositions, and to new methods for the control of undesired plant growth by pre-emergence and post-emergence application of said new and useful herbicidal compounds.

The novel herbicidal compounds of this invention are substituted pyrimidopyrimidinones which provide effective herbicidal control of the growth of a wide variety of grassy and broad-leaved plant species when applied and utilized by commonly accepted methods.

The new class of herbicidal compounds of this invention has the formula:

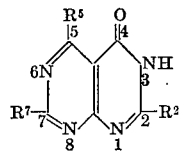

in which $R^2$ and $R^5$ may be the same or different members of the group consisting of straight or branched lower aliphatic radicals (1 to 4 carbon atoms), with the proviso that the total number of carbon atoms in $R^2$ plus $R^5$ is at least 4, and $R^7$ is hydrogen or straight or branched lower aliphatic radical (1 to 4 carbon atoms). Superscripts used herein indicate the position of R on the pyrimidopyrimidinone ring system.

Preferred herbicidal pyrimidopyrimidinones of this invention are those compounds in which said lower aliphatic radicals are hydrocarbon. Particularly preferred are those compounds in which $R^5$ is isopropyl and $R^7$ is hydrogen.

The preparation of the new pyrimidopyrimidinones of this invention may be conveniently carried out from readily available materials. Methods of synthesis are illustrated by the following schema wherein a herbicidal pyrimidopyrimidinone of the invention is designated I and $R^2$, $R^5$ and $R^7$ have the significance set forth above:

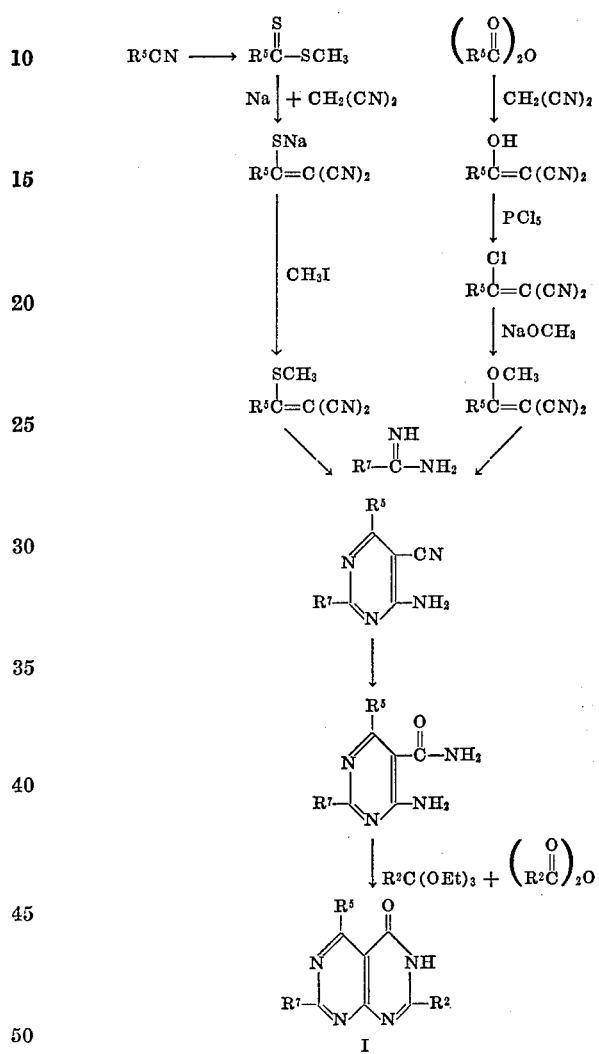

Preparation of many of the intermediates used in the synthesis illustrated above has not previously been described. In order that the new compounds of this invention may be readily available to those skilled in the art, the methods for preparation of those intermediates used in the examples are set forth below. The examples describing the synthesis of the pyrimidopyrimidinones follow the description of the preparation of the intermediates. All temperatures are in degrees centigrade. Unless otherwise specified, concentration of liquid volumes was carried out under the reduced pressure produced by a water aspirator.

EXAMPLE I

Preparation of 4-Amino-5-carbamoyl-2-ethyl-6-isopropylpyrimidine (A) Methyl dithioisobutyrate.—To a solution of 138.2 g. of isobutyronitrile in 500 ml. of benzene which had been chilled to 0° was added 126.2 g. of methyl mercaptan. Hydrogen chloride was bubbled through the mixture for 3 hours, while maintaining the temperature of the mixture at 0°. The reaction mixture was allowed to stand overnight, then concentrated to give a white solid. To the solid was slowly added 600 ml. of cold (0°) hydrogen sulfide-saturated pyridine. Hydrogen sulfide was bubbled through the reaction mixture for 6 hours at 0° and then the mixture was treated with 250 ml. of water, followed by 250 ml. of hydrochloric acid. The resultant yellow solution was extracted with three 400-ml. portions of diethyl ether and the extracts were combined, washed with water, dried ($MgSO_4$), filtered and concentrated. Distillation of the residue gave methyl dithioisobutyrate, b.p. 48–51°/8 mm.

(B) 2-Cyano - 3 - mercapto-4-methyl-2-pentenenitrile, sodium salt.—A freshly-prepared solution of 4.5 g. of sodium in 200 ml. of anhydrous ethanol was chilled and to this was simultaneously added 25 g. of methyl dithioisobutyrate and 12.3 g. of malononitrile, keeping the reaction mixture at 0 to 5°. After refluxing for 3 hours, the reaction mixture was cooled and used in the reaction with methyl iodide without further purification.

(C) 2-Cyano - 4 - methyl - 3 - methylthio-2-pentenenitrile.—To the product of Example I(B) was added dropwise 28.4 g. of methyl iodide. The mixture was stirred for about 24 hours at ambient temperature, after which the mixture was concentrated. The residue was stirred with benzene. The benzene suspension was filtered, dried ($MgSO_4$) and concentrated to give 26 g. of 2-cyano-4-methyl-3-methylthio-2-pentenenitrile which was further reacted without purification. The IR spectrum of the product was consistent with the assigned structure.

(D) 4-Amino - 5 - cyano - 2 - ethyl-6-isopropylpyrimidine.—To a freshly-prepared solution of 3.6 g. of sodium in 235 ml. of anhydrous ethanol was added 18.5 g. of propionamidine acetate. The reaction mixture was stirred at room temperature for several minutes and then filtered. Particular care was taken to maintain the reaction mixture in an anhydrous condition. To the filtrate was added dropwise the product of Example I(C), keeping the temperature of the reaction mixture below 35° throughout the addition. The reaction mixture was stirred for 1 hour after addition was completed and then concentrated. The solid residue was stirred with water, collected by filtration and recrystallized from ethanol. The white solid was washed with water and dried to give 14.6 g. of 4-amino-5-cyano-2-ethyl-6-isopropylpyrimidine, m.p. 175–176°. An additional 4.5 g. of product was obtained by concentration of the filtrate from recrystallization.

(E) 4-Amino - 5 - carbamoyl - 2 - ethyl-6-isopropylpyrimidine.—To 100 ml. of stirred concentrated sulfuric acid was added 10.9 g. of 4-amino-5-cyano-2-ethyl-6-isopropylpyrimidine (from I(D)), the mixture was heated at 90–120° for 2 hours, allowed to cool, and then was poured onto crushed ice. Cold sodium hydroxide solution was added to pH 9. The mixture was extracted with two 500-ml. portions of ethyl acetate and the extracts were combined, dried ($MgSO_4$) and concentrated to give 8.7 g. of 4-amino-5-carbamoyl-2-ethyl-6-isopropylpyrimidine, m.p. 170–172°. The IR spectrum was consistent with the assigned structure.

EXAMPLE II

Preparation of 4-Amino-5-cyano-6-isopropylpyrimidine via 2-cyano-4-methyl-3-methylthio-2-pentenenitrile To a freshly-prepared solution of 2.8 g. of sodium in 122 ml. of anhydrous ethanol was added 12.8 g. of formamidine acetate. The mixture was stirred for 30 minutes, filtered, and then 20.4 g. of 2-cyano-4-methyl-3-methylthio-2-pentenenitrile was added, care being taken to keep the mixture anhydrous. The reaction was mildly exothermic. The reaction mixture was stirred overnight and filtered. The collected yellow-orange precipitate was recrystallized from ethanol.

The orange liquid filtrate was concentrated to obtain a semisolid which was treated with water to leave a red insoluble solid. This solid was recrystallized from ethanol. The water solution was extracted twice with 200-ml. portions of ethyl acetate. The ethyl acetate extracts were concentrated and the residual solid combined with the solid obtained by recrystallization of the water-insoluble red solid. The combined solids were washed with hexane to give 4-amino-5-cyano-6-isopropylpyrimidine, m.p. 179–181°. The hexane-washed solids were combined with the recrystallized solid from the original precipitate to give 5.2 g. of 4-amino-5-cyano-6-isopropylpyrimidine. A sample was dissolved in ethanol, treated with charcoal and allowed to crystallize to give white solid, m.p. 185–185.5°.

*Analysis.*—Calc'd for $C_8H_{10}N_4$: C, 59.24; H, 6.21; N, 34.55. Found: C, 58.72; H, 6.04; N, 35.06.

EXAMPLE III

Preparation of 4-Amino-5-cyano-6-isopropylpyrimidine via 2-cyano-3-methoxy-4-methyl-2-pentenenitrile (A) 2-Cyano - 3 - hydroxy-4-methyl-2-pentenenitrile.—To a solution of 66.1 g. of malononitrile in 800 ml. of methylene chloride was added, with stirring, 173 g. of potassium carbonate. During 20 minutes, 158.2 g. of isobutyric anhydride was added (slightly exothermic reaction) and the reaction mixture was heated under reflux for 3 hours. After the mixture had cooled, 500 ml. of concentrated hydrochloric acid was added dropwise and then 500 ml. of water was added. The two-phase system was stirred for 15 minutes, after which the methylene chloride phase was separated, filtered, dried ($MgSO_4$) and concentrated. The residual oil was crystallized by treatment with hexane to give 112.7 g. of 2-cyano-3-hydroxy-4-methyl-2-pentenenitrile, m.p. 87–91°. The IR spectrum of the product was consistent with the assigned structure.

(B) 3-Chloro-2-cyano-4-methyl-2-pentenenitrile.—To a solution of 112.7 g. of 2-cyano-3-hydroxy-4-methyl-2-pentenenitrile in 500 ml. of methylene chloride was added in small portions 224 g. of phosphorus pentachloride. The reaction mixture was stirred at room temperature for 21 hours, after which it was chilled and sulfur dioxide was bubbled through for 40 minutes. The mixture was concentrated and the residual oil was distilled to give 69.7 g. of 3 - chloro-2-cyano-4-methyl-2-pentenenitrile, b.p. 63–67°/0.15 mm. The IR spectrum was consistent with the assigned structure.

(C) 2-Cyano-3-methoxy-4-methyl-2-pentenenitrile.—One hundred eight milliliters of a 25% solution of sodium methoxide in methanol was diluted by adding 150 ml. of methanol. This solution was chilled and 69.7 g. of 3-chloro-2-cyano-4-methyl-2-pentenenitrile was added dropwise while the reaction mixture was stirred and the temperature maintained below 40°. The mixture was stirred for 1 hour at ambient temperature, filtered, and concentrated to an oil. The oil was dissolved in diethyl ether and the ethereal solution was filtered to eliminate insoluble solids. The solution was concentrated and the resultant oil was distilled to give 38.8 g. of 2-cyano-3-methoxy-4-methyl-2-pentenenitrile, b.p. 53–60°/0.017 mm., $n_D^{25}$ 1.4809. The IR spectrum was consistent with the assigned structure.

(D) 4-Amino-5-cyano-6-isopropylpyrimidine.—A mixture of 80.5 g. of formamidine acetate, 168 ml. of 25% sodium methoxide in methanol and 700 ml. of methanol was stirred while 38.8 g. of 2-cyano-3-methoxy-4-methyl-2-pentenenitrile was added dropwise. The reaction was mildly exothermic. The reaction mixture was stirred for 45 minutes, and the precipitate was collected by filtration to give a solid, m.p. 184–186°. The filtrate was concentrated, the residue was dispersed in 800 ml. of water, and additional solid, m.p. 184–186°, was collected by filtration. The solids were combined to give, after drying in a vacuum oven, 28.4 g. of 4-amino-5-cyano-6-isopropylpyrimidine.

EXAMPLE IV

Preparation of 4-Amino-5-carbamoyl-6-isopropyl-pyrimidine

A mixture of 9.3 g. of 4-amino-5-cyano-6-isopropyl-pyrimidine and 100 ml. of concentrated sulfuric acid was heated at 90° for 3 hours. The clear red solution was poured into crushed ice, ammonium hydroxide was added to pH 9, and the mixture was extracted twice with 200-ml. portions of ethyl acetate. The ethyl acetate extracts were combined, dried (MgSO$_4$) and concentrated to give 3.2 g. of a yellow solid, M.P. 204–208°. The IR spectrum of the solid was consistent with that expected of 4-amino-5-carbamoyl-6-isopropylpyrimidine.

The aqueous mixture was subjected to continuous extraction overnight with ethyl acetate. The content of the receiving flask was concentrated to give an additional 1.9 g. of the product. The combined yield of 4-amino-5-carbamoyl-6-isopropylpyrimidine was 5.1 g.

EXAMPLE V

Preparation of 4-Amino-5-carbamoyl-6-ethylpyrimidine (A) 2-Cyano-3-ethoxy-2-pentenenitrile.—A mixture of 33.0 g. of malononitrile, 98.6 g. of triethyl orthopropionate and 150 ml. of acetic anhydride was heated under reflux for 9.5 hours. The mixture was concentrated and the residual oil distilled to give 71.9 g. of 2-cyano-3-ethoxy-2-pentenenitrile, B.P. 81–87°/0.14 mm. $n_D^{25}$ 1.4884. The IR spectrum was consistent with the assigned structure.

(B) 4-Amino-5-cyano-6-ethylpyrimidine.—Using the method of Example III(D), 30.0 g. of 2-cyano-3-ethoxy-2-pentenenitrile was reacted with 62.5 g. of formamidine acetate in the presence of sodium methoxide (130 ml. of 25% NaOCH$_3$ in methanol) in 600 ml. of methanol to give 15.4 g. of crude 4-amino-5-cyano-6-ethylpyrimidine, M.P. 142–146°. Recrystallization from ethanol gave 13.6 g. of yellow solid, M.P. 142–145°. Another recrystallization from ethanol increased the melting point to 144.5–147°. The IR and NMR spectra were consistent with the assigned structure. An additional 1.5 g. of product, M.P. 144.5–147°, was obtained by further treating the aqueous mixture from which the crude product was obtained.

*Analysis.*—Calc'd for C$_7$H$_8$N$_4$: C, 56.74; H, 5.44; N, 37.81. Found: C, 56.45; H, 5.60; N, 37.59.

(C) 4-Amino-5-carbamoyl-6-ethylpyrimidine.—A mixture of 15.1 g. of 4-amino-5-cyano-6-ethylpyrimidine and 100 ml. of concentrated sulfuric acid was heated at 90° for 2 hours. The reaction mixture was poured into 1000 ml. of ice. The mixture was cooled in an ice bath and neutralized with concentrated ammonium hydroxide. The white solid which separated was collected by filtration to give, after drying overnight in a vacuum oven, 13.4 g. of 4-amino-5-carbamoyl-6-ethylpyrimidine, M.P. 203–206°. The IR spectrum was consistent with the assigned structure.

*Analysis.*—Calc'd for C$_7$H$_{10}$N$_4$O: C, 50.59; H, 6.07; N, 33.71. Found: C, 50.58; H, 5.96; N, 33.90.

EXAMPLE VI

Preparation of 4-Amino-6-*tert*-butyl-5-cyanopyrimidine (A) 2 - Cyano - 3 - hydroxy - 4,4 - dimethyl - 2 - pentenenitrile.—To a mixture of 66.0 g. of malononitrile in 1500 ml. of toluene was added, in small portions, 132 g. of potassium carbonate, followed by 102.3 g. of trimethylacetic acid in 50 ml. of toluene which was added during 15 minutes. Then 120.6 g. of trimethylacetyl chloride was added during 10 minutes. This mixture was stirred at 60° for 2 hours, then allowed to stand overnight.

In an attempt to prepare 2-cyano-3-methoxy-4,4-dimethyl-2-pentenenitrile directly, 278 g. of dimethyl sulfate was added dropwise to the mixture while the temperature was maintained at about 60°. When addition was complete, the temperature was allowed to return to room temperature, the entire mixture was mixed with 600 ml. of water, and the layers were separated. The toluene layer was found to contain only unreacted dimethyl sulfate.

The aqueous layer was acidified cautiously by addition of concentrated hydrochloric acid. The precipitate, m.p. 161–165°, was isolated and the filtrate further acidified to give a second precipitate, m.p. 158–161°. The two precipitates were combined and dried in a vacuum oven to give 103.0 g. of solid which was shown by its IR spectrum to be 2-cyano-3-hydroxy-4,4-dimethyl-2-pentenenitrile.

(B) 2-Cyano - 3 - chloro-4,4-dimethyl - 2 - pentenenitrile.—To a mixture of 103 g. of 2-cyano-3-hydroxy-4,4-dimethyl-2-pentenenitrile in 750 ml. of methylene chloride was added, in small portions, 185 g. of phosphorus pentachloride. The mixture was stirred at ambient temperature for 48 hours. Sulfur dioxide was passed through the mixture for 1 hour and the mixture concentrated. The residual oil was distilled to give 115.5 g. of 2-cyano-3-chloro-4,4-dimethyl-2-pentenenitrile, b.p. 94–98°/2.3 mm. The IR spectrum was consistent with the assigned structure.

(C) 2-Cyano - 3 - methoxy-4,4-dimethyl - 2 - pentenenitrile.—2-Cyano-3-chloro-4,4-dimethyl - 2 - pentenenitrile (107.3 g.) was reacted with sodium methoxide (153 ml. of 25% sodium methoxide in methanol in 200 ml. of methanol) by the procedure described in Example III(C). Precipitated sodium chloride was removed by filtration, the filtrate was concentrated and the residual oil was treated with 400 ml. of diethyl ether. Undissolved solid was removed by filtration, the filtrate was concentrated and the residue was distilled to give 60.4 g. of 2-cyano - 3 - methoxy-4,4-dimethyl-2-pentenenitrile, b.p. 71–78°/0.04–0.05 mm.; $n_D^{25}$ 1.4842. The IR and NMR spectra were consistent with the assigned structure.

*Analysis.*—Calc'd for C$_9$H$_{12}$N$_2$O: C, 65.83; H, 7.37; N, 17.06. Found: C, 65.03; H, 7.54; N, 16.67.

(D) 4-Amino - 6 - *tert*-butyl - 5 - cyanopyrimidine.—A solution of formamidine in methanol was prepared by adding 114.9 g. of formamidine acetate to a mixture of 238 ml. of 25% sodium methoxide in methanol and 600 ml. of methanol. To this solution was added 60.4 g. of 2-cyano-3-methoxy-4,4-dimethyl-2-pentenenitrile and the mixture was stirred for 1 hour. The crystalline white solid, m.p. 188–190°, was isolated by filtration and the filtrate concentrated. The residue was mixed with 500 ml. of water and the insoluble solid was isolated on a filter, washed with water and dried to give pale cream-colored crystals, m.p. 187–190°. The solids were combined to give 54.9 g. of 4-amino-6-*tert*-butyl-5-cyanopyrimidine, m.p. 188–190° (from ethanol). The IR and NMR spectra were consistent with the assigned structure.

Another sample, shown by NMR to be identical, was analyzed.

*Analysis.*—Calc'd for C$_9$H$_{12}$N$_4$: C, 61.34; H, 6.86; N, 31.79. Found: C, 61.09; H, 7.05; N, 31.76.

EXAMPLE VII

2,7-Diethyl-5-isopropylpyrimido[4,5-d]pyrimidin-4(3H)-one

A mixture of 2 g. of 4-amino-5-carbamoyl-2-ethyl-6-isopropylpyrimidine, 15 ml. of propionic anhydride and 15 ml. of triethyl orthopropionate was heated at the reflux temperature under nitrogen for 3 hours. The reaction mixture was concentrated and the orange residue was refluxed with 20 ml. of ammonium hydroxide for 1 hour, then set aside overnight. The precipitated orange solid was collected by filtration and recrystallized from cyclohexane. The first crop of crystals melted at 127–136° and the IR spectrum was consistent with that expected of tri-substituted pyrimido[4,5 - d]pyrimidinone. The second crop, m.p. 147–149°, was recrystallized from cyclohexane to give 2,7-diethyl-5-isopropylpyrimido[4,5-d]pyrimidin-4(3H)-one, m.p. 148–149°, the NMR spectrum of which was consistent with the assigned structure.

*Analysis.*—Cal'd for $C_{12}H_{18}N_4O$: C, 63.39; H, 7.37; N, 22.75. Found: C, 63.46; H, 7.28; N, 22.95.

All solids isolated were combined and dissolved in dilute ammonium hydroxide (without heating), the solution was filtered and acidified carefully to pH 7 (the product is soluble in either strong base or strong acid) while cooling in an ice bath. The solid was collected and recrystallized from cyclohexane to give 1.5 g. of 2,7-diethyl-5 - isopropylpyrimido[4,5-d]pyrimidin-4(3H)-one, m.p. 150–151.5°.

EXAMPLE VIII

2-Ethyl-5-isopropylpyrimido[4,5-d] pyrimidin-4(3H)-one

A mixture of 5.1 g. of 4-amino-5-carbamoyl-6-isopropylpyrimidine (from V(B)), 42.5 ml. of propionic anhydride and 42.5 ml. of triethyl orthopropionate was heated at reflux temperature under nitrogen for 3 hours. After concentration of the reaction mixture, the yellow-orange residue was stirred with 71 ml. of ammonium hydroxide for 1 hour, the mixture was filtered and the filtrate acidified. When no solid separated, the solution was neutralized and was extracted with two 200-ml. portions of ethyl acetate. The extracts were combined, dried ($MgSO_4$) and concentrated to a solid. The solid was recrystallized twice from toluene (using charcoal the second time) to give 4.4 g. 2-ethyl - 5 - isopropylpyrimido [4,5-d]pyrimidin-4(3H)-one, m.p. 157–160°. The NMR spectrum was consistent with the assigned structure.

*Analysis.*—Calc'd for $C_{11}H_{14}N_4O$: C, 60.53; H, 6.47; N, 25.67. Found: C, 60.79; H, 6.52; N, 25.37.

EXAMPLE IX 2,5-Diethylpyrimido[4,5-d]pyrimidin-4(3H)-one

A mixture of 10.0 g. of 4-amino-5-carbamoyl-6-ethyl-pyrimidine, 90 ml. of triethyl orthopropionate and 90 ml. of propionic anhydride was heated at reflux temperature under nitrogen for 3 hours, then allowed to stand at ambient temperature for 18 hours. The precipitate which formed was isolated on a filter and the filtrate was concentrated to an oil. The oil was stirred with 200 ml. of ammonium hydroxide and the insoluble solid isolated. The two solids, shown by infrared spectra to be identical, were combined and recrystallized from ethanol to give 4.4 g. of 2,5-diethylpyrimido[4,5-d]pyrimidin-4(3H)-one, m.p. 183–184.5°. The NMR spectrum was consistent with the assigned structure.

*Analysis.*—Calc'd for $C_{10}H_{12}N_4O$: C, 58.81; H, 5.92; N, 27.43. Found: C, 58.96; H, 6.15; N, 27.38.

EXAMPLE X

5-Isopropyl-2-propylpyrimido[4,5-d]pyrimidin-4(3H)-one

A mixture of 10.0 g. of 4-amino-5-carbamoyl-6-isopropyl-pyrimidine, 85 ml. of triethyl orthobutyrate and 85 ml. of butyric anhydride was heated at reflux temperature under nitrogen for 3 hours, then allowed to stand at ambient temperature for 18 hours. The reaction mixture was concentrated to an oily solid which was dissolved in 150 ml. of concentrated ammonium hydroxide and filtered. The filtrate was cooled in an ice bath and neutralized with concentrated hydrochloric acid. The precipitate was collected and the aqueous filtrate was extracted twice with 100-ml. portions of ethyl acetate. The extracts were combined, dried ($MgSO_4$) and concentrated. The solid residue was combined with the precipitate and the mixture recrystallized from methanol to give 4.9 g. of 5-isopropyl - 2 - propylpyrimido[4,5-d]pyrimidin-4(3H)-one, m.p. 145–147°. The NMR spectrum was consistent with the assigned structure.

*Analysis.*—Calc'd for $C_{12}H_{16}N_4O$: C, 62.05; H, 6.94; N, 24.19. Found: C, 62.22; H, 7.17; N, 24.50.

EXAMPLE XI 2,5-Diisopropylpyrimido[4,5-d]pyrimidin-4(3H)-one (A) Initial synthesis.—A mixture of 2.0 g. of 4-amino-5-carbamoyl-6-isopropylpyrimidine, 5.25 ml. of isobutyric anhydride and 25 ml. of pyridine was heated on a steam bath for 4 hours, then concentrated. The residual semi-solid was dissolved successively in ethanol-water, acetone and chloroform, but in each case solubility was too great to permit recrystallization and the solutions were concentrated. The residue from chloroform was stirred with diethyl ether to give 1.2 g. of solid which was recrystallized from ethanol to give 1.0 g. of crude 4-isobutyramido-6-isopropylpyrimidine-5-carboxamide. This 1.0 g. was mixed with 15 ml. of anhydrous glycerine and the mixture heated at 185° for 4 hours. The mixture was poured into water and the aqueous mixture extracted with ethyl acetate. The extracts were dried ($MgSO_4$) and concentrated to give a small amount of solid. The solid was dissolved in 10% aqueous potassium hydroxide. The solution was treated with charcoal and neutralized to pH 7.5. The precipitate was collected, dried and successively recrystallized from cyclohexane-carbon tetrachloride and thrice from acetonitrile to give a small amount of 2,5-diisopropylpyrimido[4,5 - d]pyrimidin - 4(3H)-one, m.p. 161–162.5°. The IR and NMR spectra were consistent with the assigned structure.

*Analysis.*—Calc'd for $C_{12}H_{16}N_4O$: C, 62.05; H, 6.94; N, 24.12. Found: C, 62.05; H, 7.18; N. 24.30.

(B) 5 - Carbamoyl-4-isobutyramido-6-isopropylpyrimidine.—A mixture of 7.0 g. of 4-amino-5-carbamoyl-6-isoproplypyrimidine and 18.4 g. of isobutyric anhydride in 80 ml. of pyridine was heated in a steam bath for 4 hours. About half of the pyridine was removed by concentration and the concentrated solution was allowed to stand for 24 hours. The solid which separated was collected by filtration and recrystallized from methanol to give 1.5 g. of solid, m.p. 209–211°, which was shown by NMR spectroscopy to be 4-isobutyramido-6-isopropyl-pyrimidine-5-carboxamide.

*Analysis.*—Calc'd for $C_{12}H_{18}N_4O_2$: C, 57.58; H, 7.25; N, 22.39. Found: C, 57.63; H, 7.16; N, 22.67.

The filtrate was concentrated, the residue was suspended in water and this mixture was neutralized with sodium bicarbonate. The suspended solid was collected by filtration and dried to give 4.2 g. of solid which was recrystallized twice from methanol to give 1.6 g. of 5-carbamoyl - 4 - isobutyramido-6-isopropylpyrimidine, m.p. 206–209°.

(C) 2,5 - Diisopropylpyrimido[4,5 - d]pyrimidin - 4-(3H)-one.—A mixture of 2.3 g. of 5-carbamoyl-4-isobutyramido-6-isopropylpyrimidine and 20 ml. of anhydrous glycerin was heated at 180° under nitrogen for 4 hours. The mixture was allowed to cool, then was diluted with water. The precipitate was collected by filtration, washed with water and recrystallized from acetonitrile to give 1.0 g. of 2,5-diisopropylpyrimido[4,5 - d]pyrimidin - 4(3H)-one. The acetonitrile filtrate was concentrated and the residue again recrystallized from acetonitrile to give an additional 0.5 g., M.P. 158.5–162°. The IR and NMR spectra showed this product to be identical with that previously obtained.

EXAMPLE XII

2-*tert*-Butyl-5-isopropylpyrimido[4,5-d]pyrimidin-4-(3H)-one

A mixture of 10.0 g. of 4-amino-5-carbamoyl-6-isopropylpyrimidine and 31.1 g. of trimethylacetic anhydride in 100 ml. of dry (KOH) pyridine was heated under reflux for 5 hours, then allowed to stand overnight. The mixture was concentrated and the residue was further subjected to concentration at 1 mm. until only a thick syrup remained. The residue was dissolved in ethyl acetate. The solution was washed with sodium carbonate solution, dried (MgSO₄) and concentrated to give 4.7 g. of light tan solid, M.P. 206–208°. The IR and NMR spectra showed the expected acylation product to have undergone cyclization to give 2-*tert*-butyl-5-isopropylpyrimido[4,5-d]pyrimidin-4(3H)-one Recrystallization from ethanol-water gave solid, M.P. 207–209.5°.

*Analysis.*—Calc'd for $C_{13}H_{18}N_4O$: C, 63.39; H, 7.37; N, 22.75; Found: C, 63.61; H, 7.52; N, 23.00.

EXAMPLE XIII

5-*tert*-Butyl-2-ethylpyrimido[4,5-d]pyrimidin-4(3H)-one

A mixture of 2.0 g. of 4-amino-6-*tert*-butyl-5-carbamoyl-pyrimidine, 20 ml. of triethyl orthopropionate and 20 ml. of propionic anhydride was heated under reflux for 24 hours. The mixture was concentrated and the oily residue was stirred with 100 ml. of concentrated ammonium hydroxide at 50° for 1.5 hours. The insoluble solid, which was unreacted 4-amino-6-*tert*-butyl - 5 - carbamoylpyrimidine, was removed by filtration. The filtrate was cooled, neutralized with concentrated hydrochloric acid and allowed to stand for 72 hours. The solid which separated was recrystallized from methanol to give 0.8 g. of yellow crystals of 5- *tert*-butyl-2-ethylpyrimido[4,5-d]pyrimidin-4(3H)-one, m.p. 164–166°. The IR and NMR spectra were consistent with the assigned structure.

*Analysis.*—Calc'd for $C_{12}H_{16}N_4O$: C, 62.05; H, 6.95; N, 24.12. Found: C, 62.27; H, 6.88; N, 24.17.

The above reaction was repeated using 6.0 g. of 4-amino-6-*tert*-butyl-5-carbamoylpyrimidine to give 1.9 g. of 5-*tert*-butyl - 2 - ethylpyrimido[4,5-d]pyrimidine-4(3H)-one, m.p. 163–165° (from methanol, then ethanol).

The herbicidal activities of the compounds of this invention were demonstrated as follows. In pre-emergence tests, rows of seeds of lima beans (*Phaseolus lunatus*), corn (*Zea mays*), lettuce (*Lactuca sativa*), mustard (*Brassica juncea*) and crabgrass (*Digitaria sanquinalis*) were planted in shallow flat-bed trays (8" x 6" x 3") containing 2" to 3' of sandy loam soil. Within 24 hours after planting, an aqueous acetone solution of a compound of the invention (using sufficient acetone to obtain solution) was sprayed on the soil at a rate equivalent to 8 pounds per acre (8.96 kilograms per hectare), using a total volume equivalent to 80 gallons per acre (748 liters per hectare). The trays were maintained under normal growing conditions in the greenhouse for about 2 weeks, after which the herbicidal efficacy of the compound was assessed. Individual plant species were examined in comparison with untreated plants. Table I lists data collected in pre-emergence tests with compounds of the present invention.

In post-emergence tests, rows of seeds were planted as for pre-emergence tests and the untreated flats were maintained in the greenhouse until the first trifoliate leaves of the bean plants were unfolding. The test plants were then sprayed with an aqueous acetone solution of a compound as for pre-emergence tests. The plants were returned to the greenhouse and held under normal growing conditions for about 2 more weeks, after which the herbicidal efficacy of the compound was assessed. Table II lists data collected in post-emergence tests of compounds of the present invention.

TABLE I.—PRE-EMERGENCE HERBICIDAL ACTIVITY OF PYRIMIDOPYRIMIDINONES

| Compound of Example | Percent kill at 8 lb./acre | | | | |
| --- | --- | --- | --- | --- | --- |
| | Lima bean | Corn | Lettuce | Mustard | Crabgrass |
| VII | a 0 | 0 | 10 | a 95 | 100 |
| VIII b | 100 | a 95 | a 80 | a 95 | a 95 |
| IX | 100 | 0 | 50 | 100 | 0 |
| X | 100 | 100 | 100 | 100 | 100 |
| XI | 100 | a 30 | 100 | 100 | a,c 40 |
| XII | 100 | a 0 | 100 | 100 | a 70 |
| XIII | 50 | 0 | 80 | 100 | 0 | a Plants not dead are severely damaged and not expected to live.
b Seeds exposed at time of spraying.
c Stunted.

TABLE II.—POST-EMERGENCE HERBICIDAL ACTIVITY OF PYRIMIDOPYRIMIDINONES

| Compound of Example | Percent kill at 8 lb./acre | | | | |
| --- | --- | --- | --- | --- | --- |
| | Lima bean | Corn | Lettuce | Mustard | Crabgrass |
| VII | a,b 30 | 0 | 100 | 100 | 30 |
| VIII | 100 | 100 | 100 | 100 | 100 |
| IX | 100 | 0 | 100 | 60 | 0 |
| X | 100 | 100 | 100 | 100 | a 80 |
| XI | 100 | 100 | 100 | 100 | 100 |
| XII | 100 | 100 | 100 | 100 | 100 |
| XIII | 100 | 0 | 0 | 0 | 0 | a Plants not dead are severely damaged and not expected to live.
b Defoliant properties.

For herbicidal applications, di- and trialkylpyrimido-[4,5-d]pyrimidin-4(3H)-ones may be utilized in diverse formulations including the agricultural adjuvants and agricultural carriers, i.e. those materials normally employed to facilitate the dispersion of active ingredients in agricultural applications, recognizing the fact that the formulation and mode of application of a toxicant may affect the activity of the material in a given application. Thus, a compound of this invention may be formulated as a granule of relatively large particle size, as a wettable powder, as an emulsifiable concentrate, as a solution, or as any of several other known types of formulations, depending on the desired mode of application.

Granular formulations are particularly useful for aerial distribution or for penetration of a canopy of foliage. Useful granular formulations may be of several types. Impregnated granules are those wherein the active ingredient is applied to large particles of an absorbent carrier, such as an attapulgite or kaolin clay, corncobs, expanded mica, etc., normally in the form of a solution in a solvent. Surface-coated granules may be produced by spraying the molten active ingredient onto the surface of a generally nonabsorbent particle or by spraying on a solution of active ingredient in a solvent. The core may be water-soluble such as a prilled fertilizer, or insoluble such as sand, marble chips or coarse talc. Particularly useful is a granule wherein a wettable powder is applied as a surface coating to a sand or other insoluble particle such that the wettable powder may be dispersed on contact of the granule with moisture. Granules may be produced by agglomeration of dusts or powders by compaction rollers, by extrusion through a die or by use of a granulating disc. Granular formulations may vary widely in concentration, with useful formulations containing as little as 0.5% or as much as 95% of active ingredient.

Wettable powders, also useful formulations for both pre- and post-emergence herbicides, are in the form of finely divided particles which disperse readily in water or other dispersant. The wettable powder is ultimately applied to the soil either as a dry dust or as an emulsion in water or other liquid. Typical carriers for wettable powders include fuller's earth, kaolin clays, silicas and other highly absorbent, readily wet inorganic diluents. Wettable powders normally are prepared to contain about 5% to 80% of active ingredient, depending on the absorbency of the carrier, and usually also contain a small amount of a wetting, dispersing or emulsifying agent to facilitate dispersion. For example, a useful wettable powder formulation contains 80.8 parts of 2,5-diisopropylpyrimido[4,5 - d]pyrimidin - 4(3H) - one, 17.9 parts of palmetto clay, and 1.0 part of sodium lignosulfonate and 0.3 part of sulfonated aliphatic polyester as wetting agents.

Other useful formulations for herbicidal applications are the emulsifiable concentrates, which are homogeneous liquid or paste compositions dispersible in water or other dispersant, and may consist entirely of a compound of this invention with a liquid or solid emulsifying agent, or may also contain an agriculturally acceptable liquid carrier, such as xylene, heavy aromatic naphthas, isophorone and other nonvolatile organic solvents.

Typical wetting, dispersing or emulsifying agents used in agricultural formulations include, for example, the alkyl and alkylaryl sulfonates and sulfates and their sodium salts; polyethylene oxides; sulfonated oils, fatty acid esters of polyhydric alcohols; and other types of surface-active agents, many of which are available in commerce. The surface-active agent, when used, normally comprises from 1% to 15% by weight of the herbicidal composition.

These formulations may be applied without further dilution or as dilute solutions, emulsions or suspensions in water or other suitable diluent. The compositions may be applied to the area wherein control is desired by spraying onto the undesired vegetation or onto the surface of the soil in the case of liquid compositions or by distribution from mechanical equipment in the case of solids. The surface-applied material may also be blended into the upper layer of soil by cultivation, or left as applied, as is appropriate to gain the optimum results with the particular treatment.

The active herbicidal compounds of this invention may be formulated and/or applied with insecticides, fungicides, nematicides, plant-growth regulators, fertilizers, and other agricultural chemicals. In applying the active compounds of this invention, whether formulated alone or with other agricultural chemicals, an effective amount and concentration of alkylpyrimido[4,5 - d]pyrimidin - 4 (3H)-one are of course employed.

I claim:
1. A substituted pyrimidopyrimidinone of the formula:

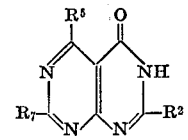

in which $R^2$ and $R^5$ are the same or different straight or branched alkyl of 1 to 4 carbon atoms, with the proviso that the total number of carbon atoms in $R^2$ plus $R^5$ is at least 4, and $R^7$ is hydrogen or straight or branched alkyl of 1 to 4 carbon atoms.

2. A compound of claim 1 in which $R^2$ contains 2 to 4 carbon atoms, $R^5$ is isopropyl radical and $R^7$ is hydrogen.

3. The compound of claim 1 which is 2,7-diethyl-5-isopropylpyrimido[4,5-d]pyrimidin-4(3H)-one.

4. The compound of claim 1 which is 2-ethyl-5-isopropylpyrimido[4,5-d]pyrimidin-4(3H)-one.

5. The compound of claim 1 which is 5-isopropyl-2-propylpyrimido[4,5-d]pyrimidin-4(3H)-one.

6. The compound of claim 1 which is 2,5-diisopropylpyrimido[4,5-d]pyrimidin-4(3H)-one.

7. The compound of claim 1 which is 2-*tert*-butyl-5-isopropylpyrimido[4,5-d]pyrimidin-4(3H)-one.

References Cited

UNITED STATES PATENTS 2,949,466   8/1960   Hoefle et al. _____ 260—256.4

RAYMOND V. RUSH, Primary Examiner

UNITED STATES PATENT OFFICE
CERTIFICATE OF CORRECTION

PATENT NO. : 3,830,812
DATED : August 20, 1974
INVENTOR(S) : A. A. Ramsey

It is certified that error appears in the above-identified patent and that said Letters Patent are hereby corrected as shown below:

Column 9, line 37, change "sanquinalis" to ---sanguinalis---.

Column 9, line 39, change "3'" to ---3"---.

Signed and Sealed this twenty-first Day of October 1975

[SEAL]

Attest:

RUTH C. MASON
*Attesting Officer*

C. MARSHALL DANN
*Commissioner of Patents and Trademarks*